(12) United States Patent
Bloechl et al.

(10) Patent No.: US 6,678,452 B1
(45) Date of Patent: Jan. 13, 2004

(54) OPTICAL WAVEGUIDE DEVICE

(75) Inventors: Peter Bloechl, Goslar (DE); Gian-Luca Bona, Hedingen (CH); Folkert Horst, Kilchberg (CH); Ilana Massarek, Thalwil (CH); Bert Offrein, Langnau am Albis (CH); Roland Germann, Wangen (CH); Huub Salemink, Groesbeek (NL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/807,627
(22) PCT Filed: Oct. 1, 1999
(86) PCT No.: PCT/IB99/01612
§ 371 (c)(1),
(2), (4) Date: Aug. 15, 2001
(87) PCT Pub. No.: WO00/22465
PCT Pub. Date: Apr. 20, 2000

(30) Foreign Application Priority Data

Oct. 15, 1998 (EP) ............................................... 98119510

(51) Int. Cl.⁷ ................................................. G02B 6/22
(52) U.S. Cl. ..................................... 385/129; 385/131
(58) Field of Search ............................... 372/26, 44, 45, 372/46; 438/38, 41; 385/129, 130, 131, 132

(56) References Cited

U.S. PATENT DOCUMENTS

| | | | |
|---|---|---|---|
| 4,358,181 A | | 11/1982 | Gulati et al. |
| 4,724,316 A | | 2/1988 | Morton |
| 4,781,424 A | | 11/1988 | Kawachi et al. |
| 4,974,232 A | * | 11/1990 | Morinaga et al. ............. 372/46 |
| 5,483,613 A | | 1/1996 | Bruce et al. |
| 5,502,781 A | | 3/1996 | Li et al. |
| 5,658,823 A | * | 8/1997 | Yang ........................... 438/38 |
| 6,031,858 A | * | 2/2000 | Hatakoshi et al. ............. 372/46 |

FOREIGN PATENT DOCUMENTS

| | | |
|---|---|---|
| EP | 0 678764 A1 | 4/1995 |
| JP | 63 099589 | 4/1988 |
| JP | 63 303305 | 12/1988 |

OTHER PUBLICATIONS

W.A.P. Claassen et al., "Characterization of Silicon–Oxynitride Films Deposited by Plasma–Enhanced CVD", J. Electrochem. Soc., vol. 133, No. 7, pp. 1458–1464.

A. Shintani et al. . .

C. Blaauw, J. Appl. Phys., vol. 54, No. 9, pp. 5064–5068, Sep. 1983.

J. Gerlach, J. Vac. Sci. Technology. vol. B8, No. 5, pp. 1068–1074, Sep./Oct. 1990.

* cited by examiner

Primary Examiner—Euncha Cherry
(74) Attorney, Agent, or Firm—McGinn & Gibb, PLLC

(57) ABSTRACT

An optical waveguide device is proposed which comprises a substrate, thereupon a lower cladding layer, thereupon an upper cladding layer and between said cladding layers a waveguide element. The influence of the substrate on the stress-induced birefringence of the optical waveguide device is reduced by modification of the substrate from underneath the waveguide element.

23 Claims, 1 Drawing Sheet

OPTICAL WAVEGUIDE DEVICE

The invention relates to an optical device with reduced birefringence. More particularly it relates to an optical planar device in which the influence of the substrate on the stress-induced birefringence of the optical waveguide device is reduced by modification of the substrate from Underneath the waveguide element.

TECHNICAL FIELD AND BACKGROUND OF THE INVENTION

Integratable planar optical waveguide devices usually consist of a multilayer stack of glass-based materials fabricated onto a suitable substrate. In cases where glass-materials comprise the multi-layer structure, a silicon substrate can be used as the fabrication base, since it is cheap and its processing is well known. Upon application of thermal processing of the multilayer in the fabrication process (growth, diffusion, annealing), the different thermal expansion coefficients of silicon and the glasses lead to unacceptably high values of induced anisotropic stress within the optical guiding structure, notably near the waveguide core. The induced stress changes the propagation characteristics of the TE and TM optical polarizations. With other words, the stress-anisotropy causes birefringence, i.e. polarization-dependent refractive indices. As a practical example, the high refractive index contrast in silica-on-silicon waveguide technology with SiON core layers can be seen. Optical birefringence is a limiting factor in the use and scalability of SiON waveguide technology.

In the article "Characterization of Silicon-Oxynitride Films deposited by Plasma Enhanced CVD" by Claassen, v.d. Pol, Goemans and Kuiper in J. Electrochem. Soc.: Solid state science and technology, July 1986, pp 1458–1464 the composition and mechanical properties of silicon-oxynitride layers made by plasma-enhanced deposition using different gas mixtures are investigated. It is stated that the mechanical stress strongly depends on the amount of oxygen and hydrogen incorporated in the layer. Heat treatment at temperatures higher than the deposition temperature leads to a densification of the film due to hydrogen desorption and cross-linking.

In "Temperature dependence of stresses in chemical vapor deposited vitreous films" by Shintani, Sugaki and Nakashima in J. Appl. Phys. 51(8), August 1980, pp 4197–4205 its is shown that in vitreous silicate glass depending on deposition background pressure different components of tensile and compressive stress occur. Also a hysteresis of the stress is observed.

In "Stress in chemical-vapor-deposited $SiO_2$ and plasma-$SiN_x$ films on GaAs and Si" by Blaauw in J. Appl. Phys. 54(9), September 1983, pp 5064–5068 stress in films of CVD-$SiO_2$ and plasma-$SiN_x$ on GaAs is measured as a function of temperature. Different properties of the stress are observed depending on e.g. film thickness, doping and annealing parameters. "Stress in silicon dioxide films deposited using chemical vapor deposition techniques and the effect of annealing on these stresses" by Bhushan, Muraka and Gerlach in J. Vac Sci. Technol. B 8(5), September/October 1990, pp 1068–1074 deals with in situ measured stress as a function of annealing temperature. Different deposition techniques are investigated and in PECVD silica films on silicon substrates a change of the stress sign from tensile to compressive is observed with rising annealing temperature.

In U.S. Pat. No. 5,502,781, integrated optical devices which utilize a magnetostrictively, electrostrictively or photostrictively induced stress to alter the optical properties of one or more waveguides in the device are disclosed. The integrated optical devices consist of at least one pair of optical waveguides preferably fabricated in a cladding material formed on a substrate. A stress-applying material, which may be a magnetostrictive, electrostrictive or photostrictive material, is affixed to the upper surface of the cladding material near at least one of the optical waveguides. When the appropriate magnetic, electric or photonic field is applied to the stress applying material, a dimensional change tends to be induced in the stress applying material. The constrained state of the stress applying material, however, caused by its adhesion to the cladding material, causes regions of tensile and compressive stress, as well as any associated strains, to be created in the integrated optical device. By positioning one or more optical waveguides in a region of the device which will be subjected to a tensile or compressive stress, the optical properties of the stressed waveguide may be varied to achieve switching and modulation. Latchable integrated optical devices are achieved by utilizing a controlled induced stress to "tune" one or more waveguides in an integrated optical device to a desired refractive index or birefringence, which will be retained after the field is removed.

U.S. Pat. No. 4,358,181 discloses a method of making a preform for a high numerical aperture gradient index optical waveguide. Therein the concentration of two dopant constituents is changed during fabrication. Concentration of the first dopant, $GeO_2$, is changed radially as the preform is built up in order to produce the desired radial refractive index gradient. The concentration of the second dopant, $B_2O_3$, is changed radially to compensate for the radial change in thermal expansion coefficient caused by the varying $GeO_2$ concentration. $B_2O_3$ is added to the cladding layer to make the thermal expansion coefficient of the cladding equal to or greater than the composite thermal expansion coefficient of the core. The magnitude of residual tension at the inner surface caused by thermal expansion gradients is reduced and premature cracking of the preform is eliminated.

Disclosed in U.S. Pat. No. 4,724,316 is an improved fiber-optic sensor of the type in which a fiber-optic waveguide component of the sensor is configured to be responsive to an external parameter such that curvature of the fiber-optic waveguide is altered in response to forces induced by changes in the external parameter being sensed. The alteration of the curvature of the fiber-optic waveguide causes variations in the intensity of light passing therethrough, these variations being indicative of the state of the external parameter. The improvement comprises coating material covering the exterior portion of the fiber-optic waveguide, the coating material having an expansion coefficient and thickness such that distortion of the fiber-optic waveguide caused by thermally induced stresses between the coating material and the glass fiber is substantially eliminated. Also disclosed is a support member for supporting the curved fiber-optic waveguide, the support member and fiber-optic waveguide being configured and arranged to minimize the effects of thermal stress tending to separate the waveguide from the support member.

A reported method to reduce the induced stress within the optical guiding channel is described in U.S. Pat. No. 4,781,424, using the application of grooves adjacent to the channel in order to relieve the stress-component within the glass layers. U.S. Pat. No. 4,781,424 is related to a single mode optical waveguide having a substrate, a cladding layer formed on the substrate, a core portion embedded in the cladding layer, and an elongated member for applying a stress to the core portion or a stress relief groove for relieving a stress from the core portion in the cladding layer along the core portion. The position, shape and material of the elongated member or the groove are determined in such a way that stress-induced birefringence produced in the core portion in accordance with a difference in thermal expansion coefficient between the substrate and the single mode optical waveguide is a desired value. In all methods disclosed therein, the device is subjected to treatment from the upper side, i.e. the side where the waveguide structure is located. The disclosed method further employs a mask to define the grooves and a removal technique to produce the grooves. Both items lead to significant additional processing work.

In EP 0 678 764 the fabrication of a polarization independent optical device is described. By building the waveguide structure on a silicon substrate, adding a reinforcing layer of glass and removing regions of the silicon substrate underlying the waveguide structure the device is fabricated. The removal of the silicon underlying the waveguide structure eliminates polarization dependent spectral effects by eliminating the source of compressive strain, and the resulting glass reinforced structures are deemed to be sufficiently robust for practical applications.

U.S. Pat. No. 5,483,613 relates to polarization-independent optical devices by reducing or eliminating strain-induced birefringence associated with prior device structures. An optical device is produced comprising a doped silica substrate having a coefficient of thermal expansion between $8 \times 10-7°$ $C.^{-1}$ and $15 \times 10-7°$ $C.^{-1}$. On the doped silica substrate is formed a doped silica waveguiding structure having a coefficient of thermal expansion between $8 \times 10-7°$ $C.^{-1}$ and $15 \times 10-7°$ $C.^{-1}$. Alternatively, the coefficient of thermal expansion of the doped silica substrate is selected to be approximately 90% to 110% of the coefficient of thermal expansion of the doped silica waveguiding structure. In another aspect, U.S. Pat. No. 5,483,613 provides an optical device comprising a doped silica substrate having a doping gradient from a lower surface to an upper surface. The doping level at the upper surface has a coefficient of thermal expansion approximating the coefficient of thermal expansion of a doped silica waveguiding structure formed thereon.

OBJECT AND ADVANTAGES OF THE INVENTION

It is an object of the invention according to claim 1 to provide an optical device with reduced stress on the waveguiding structure or with well-defined stress-values in the region of interest.

It is a further object to provide an alternative solution with regard to the solutions provided in the state of the art for reducing the birefringence in an optical waveguide device.

The optical device with the features according to claim 1 has the advantage that due to the fact that the influence of the substrate is reduced from an area underneath the waveguide, the respective steps for that are less likely to influence the waveguide structure on the substrate. Since the waveguide structure is extremely prone to any post-processing influences like thermal or mechanical influence, it is of utmost advantage that processing steps after completion of the waveguide structure do not or only to a minimum have an effect to it. By treating the substrate from underneath the waveguide structure, the probability of harming the waveguide structure is significantly reduced. Also, etching means which otherwise would even damage the waveguide structure, can be used here because the treatment is done via the underside of the substrate and no contact between the etching means and the waveguide structure occurs. This widens the choice of materials and means for the substrate treatment and reduces risk of damage to the waveguide structure.

Also, treatment from the substrate-underside makes it possible to use spatially unspecific pretreatment of the substrate, i.e. a treatment which concerns the whole wafer underside and has no area-selective component in form of a mask or the like. For instance a mechanical polishing step can be used first, before applying an etching step for more precise or spatially selective substrate removal.

When a layer element with a viscosity lower than the viscosity of the lower cladding layer is arranged between the substrate and the lower cladding layer, the layer element serves for a stress reduction. A strong advantage is the maintenance of planarity and stability of the whole arrangement. Furthermore, the layer element can be manufactured by a simple deposition or material modification process which even does not need a masking step. The layer element can be manufactured by chemically modifying the substrate surface and/or the lower cladding layer and/or an additional layer which has been deposited between the substrate and the lower cladding layer. This provides for a wide variety of modification possibilities which also can be used for optimizing the properties of the layer element with regard to its stress-reducing function as well as mechanical stability and optical influence on the device performance.

The material, respectively viscosity of the layer element, also referred to as float layer, can also be chosen such that in the case of particles residing on the substrate surface which hence render the surface uneven, the float layer serves to replanarize the substrate surface in that it incorporates these particles or grains because of its inherent softness. The waveguide structure to grow on the float layer can then take advantage of a more even surface.

In the dependent claims advantageous modifications and additions to the device of claim 1 are contained.

A ridge-like protrusion element below the waveguide element is very easily manufacturable and furthermore does not reduce the mechanical device stability, because it does not need any different material and makes use of the well-established substrate manufacturing process and eventually the also well known lithography process.

To choose the ridge-like protrusion element to have a width which is such that no additional propagation losses are induced, preferably at least approximately equal to the width of the waveguide element plus twice the thickness of the upper cladding layer, is a choice of geometry which avoids the use of the complex theory of optical waveguidance and uses instead a simple formula which can be easily realized during the ridge-manufacturing process.

When the cladding layers are deposited with a deposition rate which is higher in the direction perpendicular to the upper surface of the ridge-like protrusion element and lower in the direction perpendicular to the sidewalls of the ridge-like protrusion element, the verticality of the sidewalls remains largely unaffected and hence the horizontal dimensions of the ridge-like protrusion element remain as well. This optimizes the destressing effect of the ridge-like protrusion element.

An alternative approach is to choose the substrate to not extend below the waveguiding element. This brings in the advantage that also no additional material is needed to obtain the desired birefringence-reducing effect. The waveguide structure is thereby even decoupled from any potential birefringence-introducing effect from the substrate. This means, that even a substrate made from a material which has a different thermal expansion coefficient than the cladding layers and the waveguide core, can be used without detrimental effect on birefringence.

An advantageous solution is to remove the substrate at least partially in an area below the waveguide element, because this step can be done after finishing the final waveguide layout and manufacturing process. Herefore, no anticipating view of the waveguide structure is necessary, since the removal can be adapted to the finally present waveguide structure. This leaves greater design freedom. Also, for manufacturing the substrate, no complex mask or master structure is needed at the beginning. The substrate is first manufactured as a whole and only afterwards treated with some removing step. A number of removing tools can be used, chemical as well as mechanical ones.

When the area where the substrate has been removed is filled with a filling element which has a thermal expansion coefficient at least approximately identical to the thermal expansion coefficient of the waveguide element, the stability of the arrangement is improved, maintaining the reduced birefringence. The choice of material is wider than with pure substrate modification. The filling element can also be filled in after completing the manufacturing process of the waveguide, including eventual thermal treatment. In this case, the filling element need not have a specific thermal expansion coefficient, since extreme thermal expansion difference is no longer to be assumed, because the filling element is not subjected to the extreme temperatures of the preceding process. The filling element then serves as pure mechanical stabilisator. More generally, the filling element can be an element which has a predetermined expansion coefficient in order to modify the resulting birefringence to achieve an intended value thereof.

When the optical waveguide device is mechanically stabilized, preferably by bonding it to a stabilizing element and/or depositing a stabilizing layer on it, it is subjectable to rougher environmental conditions without risking damage.

Another advantageous solution is chemical modification of the substrate in an area below the waveguide element to form a modified substrate area which has a thermal expansion coefficient at least approximately identical to the thermal expansion coefficient of the waveguide element. This method takes advantage of the stability of the substrate itself and simply adds a modification step which is not effecting material transport in the way, as filling of a depression or creating a gap would do. The modification can be seen as some kind of softening of the substrate in the desired area such that stress does not build up below the waveguide structure.

SUMMARY OF THE INVENTION

The birefringence in an optical waveguide is one of the important factors which determines performance of a waveguide type optical component part, so that it is desirable to control the birefringence value with a high degree of accuracy at a desired value.

A key problem of planar waveguide technology is solved, namely the birefringence due to non-isotropic stresses induced during the thermal processing steps. It enables to produce silicon-compatible optical components with very low polarization dependence.

The problem is solved by modifying the substrate from underneath the waveguide structure which keeps the waveguide structure largely unaffected by the modification steps.

The modification comprises the arrangement of a layer element between the substrate and the waveguide structure. Additionally one can build-up of a ridge-like protrusion element under the waveguide core, remove completely or partially the substrate under the waveguide core, or chemically modify completely or partially the substrate under the waveguide core. The ridge, layer element and chemical modification can be performed even before the waveguide structure is formed such that these birefringence-reducing measures can not affect the device performance. The last steps in manufacturing the optical waveguide device are then only the creation of the upper cladding layer and eventually a thermal treatment, like an annealing step which steps are the only ones which are to be done after manufacturing the waveguide structure.

In practice, a combination of the different stress-reduction techniques is envisaged. In this way the different removal rates and selectivities of the various techniques are exploited.

DESCRIPTION OF THE DRAWINGS

Examples of the invention are depicted in the drawings and described in detail below by way of example. It is shown in FIG. 1 the cross-section of a waveguide with a ridge-like protrusion element, FIG. 2 the cross-section of a waveguide with the substrate removed underneath the waveguide element, FIG. 3 the cross-section of a waveguide with the substrate chemically modified underneath the waveguide element, FIG. 4 the cross-section of a waveguide with a layer element.

All the figures are for sake of clarity not shown in real dimensions, nor are the relations between the dimensions shown in a realistic scale.

DETAILED DESCRIPTION OF THE INVENTION

Figure 1:
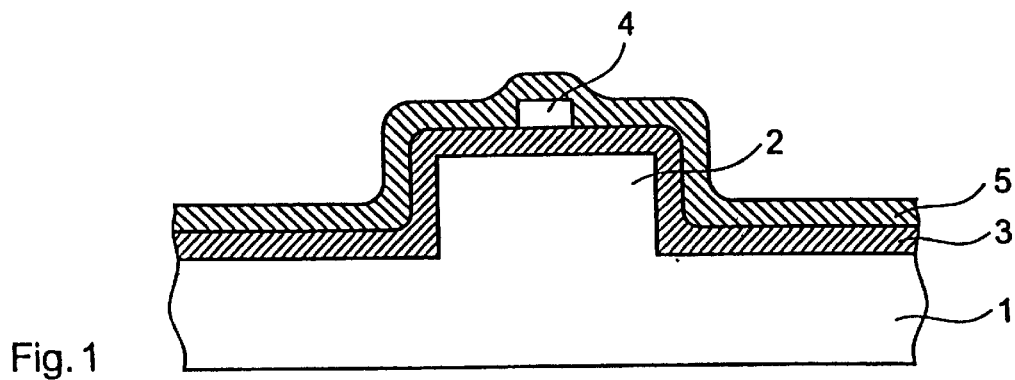

In FIG. 1 an optical device with a non-planar substrate 1 is shown in a cut sideview. The substrate 1 bears a ridge-like protrusion element 2 with a rectangular cross-section. Upon the substrate 1 and the ridge-like protrusion element 2 a lower cladding layer 3 is arranged which covers the whole surface of the ridge-like protrusion element 2 and the substrate 1. On the lower cladding layer 3 a waveguide element 4, also referred to as waveguide core or core, with a rectangular cross-section is arranged such that it lies in midst upon the ridge-like protrusion element 2, also referred to as ridge. Upon the whole arrangement an upper cladding layer 5 is arranged. What is not to be seen in the FIG. 1 is that the whole arrangement is extending in the direction perpendicular to the drawing plane. The waveguide element 4 together with the adjacent portions of the cladding layers 3, 5 forms a waveguide structure. The arrangement in total is an optical device, namely an optical waveguide.

For the function as a waveguide, the lower cladding layer 3 has as a first refractive index $n_3$, and the upper cladding layer 5 has a second refractive index $n_5$, both being lower than a third refractive index $n_4$, which is the refractive index of the waveguide core 4 which here is comprising SiON.

The nitrogen content of the waveguide core material determines its refractive index. Thus the nitrogen content is fixed in a narrow range, when a predetermined refractive index has to be obtained. In order to eliminate N-H bonds in the SiON material, a thermal annealing step can be used to extract a significant amount of the hydrogen from the SiON material. The N-H bonds have a negative impact on the function of the device, since they give rise to optical absorption in the wavelength range around 1500 nm, which lies in the optical signal transmission window for optical data transmission. After annealing, low losses are achieved, however also a mechanical stress would remain as a negative side effect if the device had a conventional design.

The cross-sectional size of the ridge 2 can be about 10 $\mu$m. The thickness of the cladding layer 3 can be about 10 $\mu$m. The thickness of the silicon substrate 1 is typically 0.3 through 1 mm. In the case of a silica single mode optical waveguide fabricated on a silicon substrate, a strong compression stress of the order of 15 kg/mm$^2$ is then resulting to the interior of the glass film surface due to the difference in thermal expansion coefficient between the silica glass and the silicon substrate 1, so that the optical waveguide exhibits stress-induced birefringence.

The ridge 2 however confines the lateral extension of the waveguide structure. As the region around the waveguide element 4 is unconstrained with respect to expansions parallel to the substrate 1, it can expand and compress laterally whereby the horizontal dimension of the ridge 2 should be such that it does not, or only to a low extent, act as a sort of sub-substrate, i.e. provide constraint for thermal lateral expansion. Therefor, a width of around 15 $\mu$m is an acceptable value. The ridge, being smaller than the substrate 1, seen horizontally, will subject the waveguide structure to less thermal expansion constraint and hence lead to a reduced stress and birefringence. Thus the stresses induced during thermal cycling, and as a consequence the stress-induced birefringence, can be substantially reduced. Any horizontal expansion or compression of the substrate 1 will hence not extend to the waveguide section which remains unaffected on the ridge-like protrusion element 2.

The width of the ridge 2 should also be designed such that no additional propagation losses are induced. Depending on the practical implementation, its lateral extension is preferably comparable to the size of the optical field or slightly larger, i.e. 10–20 $\mu$M. The size of the optical field here is defined as the dimensions of the waveguide core 4 plus an area for the evanescent field part which is adjacent to the waveguide core, typically around 3 to 5 $\mu$m.

In the following, processing steps for manufacturing the above device are described.

First, structuring of the substrate 1 may be done by etching, such that the ridge-like protrusion element 2 is created on the substrate 1. The etching can be achieved via a KOH etchant, yielding sidewall slopes of ca. 55 degrees. This is a low-cost process. Or reactive ion etching is used, yielding vertical sidewalls, resulting in a more effective stress-decoupling.

Then, formation of the lower cladding 3, e.g. made of silica, follows. A thermal oxidation of the ridge 2 can be used therefor, being a low-cost process. Alternatively, deposition of a PECVD oxide over the ridge 2 to form the lower cladding 3, can be used. This process has the advantage that the deposition rate is higher on the horizontal faces as compared to the sidewalls of the ridge 2, thus reinforcing the structuring effect and giving an additional tailoring possibility. Also evaporation of an oxide can be used which leads to a poorer silica quality but has a high directional selectivity with preference on horizontal surfaces.

For formation of the waveguide core 4, deposition of doped SiO2, SiON, PSiON or the like, e.g. a PECVD or LPCVD process can be used. Then the waveguide core material can be structured via masking and subsequent reactive ion etching.

Finally a deposition process leads to formation of the upper cladding 5 above the waveguide element 4 by a PECVD or LPCVD or other suitable process.

Figure 2:
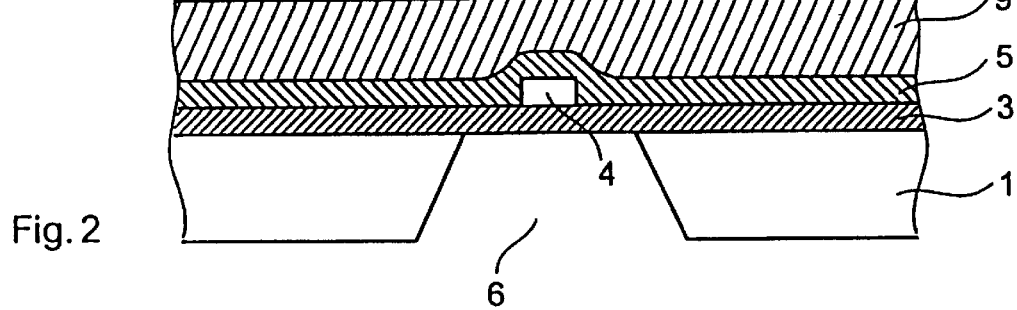

In FIG. 2 an example for substrate removal for creation of polarization-insensitive planar optical waveguides is shown, i.e. an optical device with a planar substrate 1 in form of a wafer is shown in a cut sideview.

Upon the substrate 1 a lower cladding layer 3 is arranged which covers the whole surface of the substrate 1. On the lower cladding layer 3 a waveguide element 4, also referred to as waveguide core or core, with a rectangular cross-section is arranged. Upon the whole arrangement an upper cladding layer 5 is arranged. The substrate 1 has a depression 6 right underneath the waveguide core 4, which means that the substrate 1 does not extend underneath the waveguide element 4. On top of the arrangement is deposited as means to provide a structural stability a stabilizing layer 9. What is also here not to be seen in the FIG. 2 is that the whole arrangement is extending in the direction perpendicular to the drawing plane. The waveguide element 4 together with the adjacent portions of the cladding layers 3, 5 forms a waveguide structure. The arrangement in total is an optical device, namely an optical waveguide. As the cladding layers 3, 5, oxide layers are used here.

The depicted device is an example for stress reduction via partial or complete removal of the substrate 1 underneath the waveguide structure. This procedure is suited to eliminate the thermally-induced stress due to a mismatch of the silicon substrate 1 and the oxide layers 3, 5 at high temperatures. Essentially, the waveguide device will remain as a stress-free all-glass membrane in the region around the waveguide core 4.

The cladding layers 3, 5 together hence form an isolated membrane in the region above the depression 6 which membrane is stabilized by the stabilizing layer 9, which stabilisation is useful in subsequent processing- and handling steps.

The substrate 1 can also be removed over the entire back-surface of the wafer, or only over a part thereof, or only to a certain depth.

Partial removal of the substrate 1 in the lateral dimensions of the wafer can be exploited in that the waveguide is located within a freestanding membrane, and single-sidedly connected to the wafer.

Partial removal of the silicon substrate in the vertical direction may be exploited for stress compensation.

The removal of the silicon substrate can be done via several methods:

a) Chemical-mechanical polishing of the silicon substrate 1. This method has the advantage of a high removal rate.

b) Etching (either liquid- or dry-etching) or electrochemical polishing. These methods have the advantage of being more gentle with respect to the formation of microcracks and more forgiving with respect to non-planarities. Etching has additional advantage to permit spatially selective removal.

In practice, a combination of the techniques is envisaged. In this way the different removal rates and selectivities of the various techniques are exploited.

In case the resulting membrane does not possess adequate stability for further handling, the following measures or a combination of these are foreseen to reinforce the device:

a) deposition of a silica-like material on the top-side of the waveguide structure, before substrate removal, which function is here realized by the stabilizing layer 9.

b) deposition of amorphous silicon on top of the upper cladding layer 5 and subsequent oxidation of the deposited material to amorphous silica to form the stabilizing layer 9.

c) bonding the waveguide-structure with its upper-side onto another material, suitable for processing, e.g. silicon.

Figure 3:
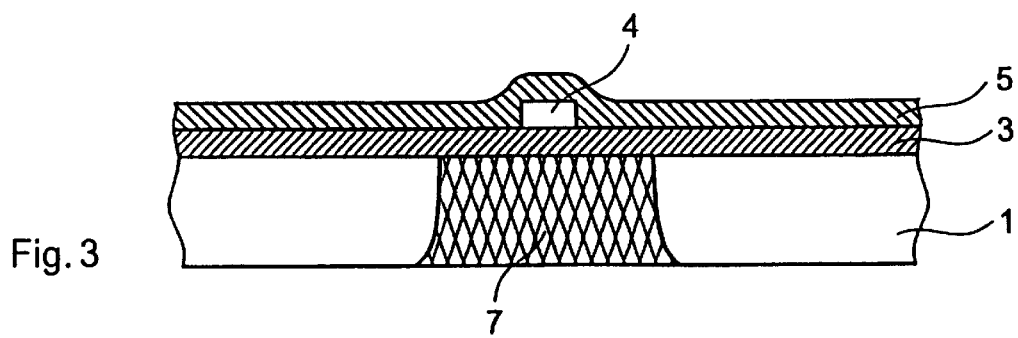

In FIG. 3, an example for substrate modification for creation of polarization-insensitive planar optical waveguides is shown, i.e. an optical device with a planar substrate 1 in form of a wafer is shown in a cut sideview.

Upon the substrate 1 a lower cladding layer 3 is arranged which covers the whole surface of the substrate 1. On the lower cladding layer 3 a waveguide element 4, also referred to as waveguide core or core, with a rectangular cross-section is arranged. Upon the whole arrangement an upper cladding layer 5 is arranged. The substrate 1 has a modified area 7 right underneath the waveguide core 4, which means that the substrate 1 per se does not extend underneath the waveguide element 4. What is also here not to be seen in the FIG. 3 is that the whole arrangement is extending in the direction perpendicular to the drawing plane. The waveguide element 4 together with the adjacent portions of the cladding layers 3, 5 forms a waveguide structure. The arrangement in total is an optical device, namely an optical waveguide. As the cladding layers 3, 5, oxide layers are here used.

The depicted device is an example for stress reduction via chemical modification of the substrate 1 underneath the waveguide structure. As chemical modification, oxidation of the substrate 1 is envisaged. The resulting silica has a thermal expansion coefficient identical to the waveguide, reducing the buildup of thermal stresses between substrate 1 and waveguide. This modification procedure is suited to eliminate the thermally-induced stress due to a mismatch of the thermal expansion coefficients of the silicon substrate 1 and the oxide layers 3, 5 at high temperatures. Since the stress in the waveguide core 4 is presumably to a small fraction due to the stress between the oxide layers 3, 5 and the waveguide core 4, and the total stress is dominated by the stress due to the different thermal expansion coefficients of the substrate 1 and the lower cladding layer 3, the modification or oxidation of the substrate 1 might not completely eliminate the thermally induced stress but reduce it.

The substrate 1 can also be modified over the entire back-surface of the wafer, or only over a part thereof, or only to a certain depth, thereby leaving e.g. a thin substrate sheet underneath the waveguide structure.

The chemical modification of the silicon substrate 1 can be done via removing the substrate 1 and filling it up with a suited material, preferably silica, or any other material with a thermal expansion coefficient close to the thermal expansion coefficient of silica and SiON, but also with a material which has a predetermined thermal expansion coefficient such that a desired value for the resulting stress is obtained. Or, the substrate can be directly modified by oxidation, chemical treatment, ion bombardment, doping or any other modification method.

In the following, an exemplary embodiment of the invention is described.

Figure 4:
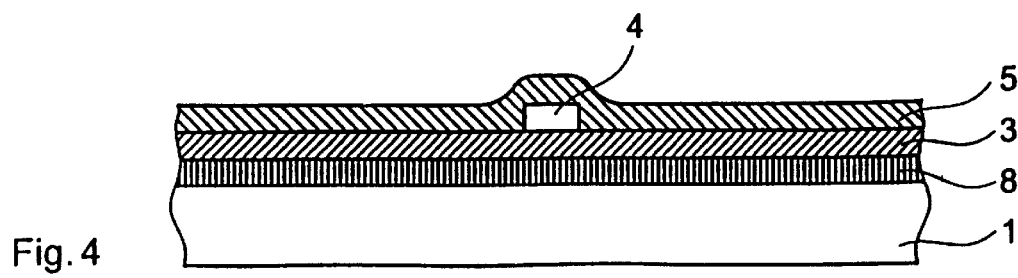

In FIG. 4 a waveguide device with a layer element in cross-sectional view is shown.

Upon the substrate 1 a lower cladding layer 3 is arranged which covers the whole surface of the substrate 1. On the lower cladding layer 3 a waveguide element 4, also referred to as waveguide core or core, with a rectangular cross-section is arranged. Upon the whole arrangement an upper cladding layer 5 is arranged. Between the substrate 1 and the lower cladding layer 3, an intermediate buffer layer 8 is arranged. What is also here not to be seen in the FIG. 3 is that the whole arrangement is extending in the direction perpendicular to the drawing plane. The waveguide element 4 together with the adjacent portions of the cladding layers 3, 5 forms a waveguide structure. The arrangement in total is an optical device, namely an optical waveguide. As the cladding layers 3, 5 oxide layers are here used. Polymers or other materials can also be used.

The layer element 8 functions as a buffer layer of low-viscosity glass between the $SiO_2$-based wave-guide and the silicon-based substrate 1. The buffer layer 8 acts to decouple the strain of the waveguide from that of the substrate 1.

In a high-temperature process step, the viscosity of a glass can be strongly reduced, so that thermal stresses are relaxed. After the process step the material is cooled, and the different thermal expansion coefficients of the glass waveguide and the silicon substrate causes stresses in the waveguide. These stresses compress the wave-guide horizontally and expand it vertically near its base, at the silicon-silica interface, while the structure is relaxed towards its top surface, which is unconstrained. The stresses are built in if the viscosity is too high and the annealing- and cooling times too short to allow full relaxation of thermal stresses.

The viscosity η follows an approximate Arrhenius type behavior:

$$\eta = \eta_0 e^{-Q/k_B T}$$

Q being an activation energy. Given a constant cooling rate, the material will lock into its final structure at an effective temperature T*, which depends on the cooling rate. If the high-temperature process step uses annealing temperatures above T*, the material can accommodate thermal stresses by viscous flow and will be essentially stress free.

As the cooling process crosses T*, the material becomes rigid and stresses are built up in the structure caused by the difference in thermal expansions in the wave-guide and the substrate 1.

The residual stresses and birefringence are proportional to $(k\{SiO_2\}-k\{Si\})(T^*T_0)$, where To is the operating temperature of the device and $k\{SiO_2\}$ and $k\{Si\}$ are the thermal expansion coefficients of silicate and silicon respectively. In the present example, the difference in thermal expansion coefficients is a factor five.

The stress is here released by separating the waveguide from the supporting structure by the buffer layer 8 of low-viscosity material, which can flow even at low anneal temperatures. The viscosity of the buffer layer shall be a compromise between rigidity of the structure, which is required in the high-temperature processes, and flexibility required to relax stresses. The buffer layer 8 can be introduced by doping the material with either boron, phosphorus, alkali, or earth alkali metals. By separating the actual wave-guide from its substrate 1 by glass that "flows" at lower temperature, the stress field can be relaxed at the temperature T* relevant for the low viscosity glass, which is substantially lower than the temperature, which would be required if the entire structure were made of $SiO_2$ and SiON. An estimate for the temperature T* is the annealing temperature at which strains are relaxed within 15 min. The annealing temperature is defined as the temperature at which the viscosity reaches $10^{13.4}$ P. For silica glass the annealing temperature is 1500 K, and, as an example for a soft glass, the annealing temperature for alkali-lead glass (KG–1) is 700 K. From the three-fold reduction of the difference between room temperature and annealing temperature for the two glasses is estimated a three-fold reduction in resulting thermal stresses. These numbers may be further altered by a judicious choice of the buffer-layer material.

Since the buffer layers are introduced at a distance of approximately 9 $\mu$m from the actual wave-guide, the optical properties, apart from the stress induced optical anisotropy, are not affected. On the other hand, the buffer layer 8 is introduced in the region where stresses are largest, namely the glass-silicon interface.

High-refractive-index contrast SiON waveguides are used in on-chip optical circuits to achieve smaller dimensions as compared to traditional $SiO_2$ waveguide technology based on Ge doping. The SiON-based process allows to use smaller bending radii of the waveguides and hence smaller components, but suffers from larger propagation losses and birefringence, because it couples the layers with different thermal expansion coefficients, namely the optical waveguide and the underlying substrate The advantage of this invention will allow high temperature process steps such as currently required to reduce absorption losses, without inducing the detrimental stress-related effects on birefringence.

The proposed measures and features can all be combined, particularly in order to optimize the resulting device in its behavior and in minimizing production cost and expenditure.

What is claimed is:

1. Optical waveguide device comprising a substrate (1), thereupon a lower cladding layer (3), thereupon an upper cladding layer (5) and between said cladding layers (3, 5) a waveguide element (4) with a predetermined width, characterized in that the influence of said substrate (1) on the stress-induced birefringence of said optical waveguide device is reduced via a layer element (8) which is arranged between said substrate (1) and said lower cladding layer (3).

2. Optical waveguide device according to claim 1, characterized in that the layer element (8) has a viscosity lower than the viscosity of said lower cladding layer (3).

3. The optical waveguide device according to claim 1, wherein the layer element comprises part of a layer selected from the group consisting of said substrate, the lower cladding layer, an additional layer which has been deposited between said substrate, and said lower cladding layer in chemically modified form.

4. The optical waveguide device according to claim 1, wherein said substrate comprises a ridge-like protrusion element below said waveguide element.

5. The optical waveguide device according to claim 4, wherein the ridge-like protrusion element has a width which is chosen such that no additional propagation losses are induced, and at least approximately equal to the width of the waveguide element plus twice a thickness of the upper cladding layer.

6. The optical waveguide device according to claim 4, wherein the upper cladding layer is thicker in a direction perpendicular to an upper surface of the ridge-like protrusion element than in a direction perpendicular to sidewalls of the ridge-like protrusion element.

7. The optical waveguide device according to one of claim 1, wherein the substrate is not extending below said waveguide element.

8. The optical waveguide device according to claim 7, wherein the substrate has been removed at least partially in an area below the waveguide element.

9. The optical waveguide device according to claim 8, wherein the area where the substrate has been removed is filled with a filling element which has a thermal expansion coefficient at least approximately identical to the thermal expansion coefficient of the waveguide element.

10. The optical waveguide device according to claim 7, wherein the optical waveguide device is mechanically stabilized by one of bonding said waveguide device to a stabilizing element and by depositing a stabilizing layer on said waveguide device.

11. The optical waveguide device according to one of claim 1, wherein the substrate has been chemically modified in an area below the waveguide element to form a modified substrate area which has a thermal expansion coefficient at least approximately identical to the thermal expansion coefficient of said waveguide element.

12. A method of manufacturing an optical waveguide device, comprising:

providing a substrate;

depositing thereupon a lower cladding layer on the substrate and an upper cladding layer on the lower cladding layer and between said cladding layers a waveguide element with a predetermined width; and arranging a layer element between said substrate and said lower cladding layer, thereby reducing an influence of said substrate on the stress-induced birefringence of said optical waveguide device.

13. Method according to claim 12, characterized in that for the layer element (8) a material is chosen that has a viscosity lower than the viscosity of said lower cladding layer (3).

14. The method according to claim 12, wherein the layer element is manufactured by chemically modifying at least one of the substrate surface, the lower cladding layer, an additional layer which has been deposited between said substrate, and said lower cladding layer.

15. The method according to claim 12, wherein said substrate comprises a ridge-like protrusion element below said waveguide element.

16. The method according to claim 15, wherein the width of the ridge-like protrusion element is at least approximately equal to the width of the waveguide element plus twice a thickness of the upper cladding layer.

17. The method according to claim 15, wherein the cladding layers are deposited with a deposition rate which is higher in the direction vertical to the upper surface of the ridge-like protrusion element and lower in the direction vertical to sidewalls of the ridge-like protrusion element.

18. The method according to claim 12, wherein the substrate is removed at least partially in an area below the waveguide element.

19. The method according to claim 18, wherein the area where the substrate has been removed is filled with a filling element which has a thermal expansion coefficient at least approximately identical to the thermal expansion coefficient of the waveguide element.

20. The method according to claim 18, wherein the optical waveguide device is mechanically stabilized by one of bonding said optical waveguide device to a stabilizing element and by depositing a stabilizing layer on said optical waveguide device.

21. The method according to claim 12, wherein the substrate is chemically modified in an area below the waveguide element to form a modified substrate area which has a thermal expansion coefficient at least approximately identical to the thermal expansion coefficient of said waveguide element.

22. The optical waveguide device according to claim 1, wherein said upper and lower cladding layers comprise amorphous material.

23. The method according to claim 12, wherein said upper and lower cladding layers comprise amorphous material.

* * * * *